(12) United States Patent
Sun et al.

(10) Patent No.: US 12,371,384 B2
(45) Date of Patent: Jul. 29, 2025

(54) INTEGRATED POLYMER-DERIVED CERAMIC THIN-FILM SENSOR PRODUCED BY LASER PYROLYSIS AND ADDITIVE MANUFACTURING AND FABRICATION METHOD THEREOF

(71) Applicant: XIAMEN UNIVERSITY, Xiamen (CN)

(72) Inventors: Daoheng Sun, Xiamen (CN); Zhenyin Hai, Xiamen (CN); Lida Xu, Xiamen (CN); Lanlan Li, Xiamen (CN); Zaifu Cui, Xiamen (CN); Chao Wu, Xiamen (CN); Guochun Chen, Xiamen (CN); Xin Li, Xiamen (CN); Qinnan Chen, Xiamen (CN); Gonghan He, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 391 days.

(21) Appl. No.: 18/063,662

(22) Filed: Dec. 8, 2022

(65) Prior Publication Data

US 2023/0183138 A1    Jun. 15, 2023

(30) Foreign Application Priority Data

Dec. 14, 2021    (CN) .......................... 202111524535.5

(51) Int. Cl.
*C04B 35/524*    (2006.01)
*B33Y 10/00*    (2015.01)
(Continued)

(52) U.S. Cl.
CPC ........ *C04B 35/524* (2013.01); *C04B 35/6267* (2013.01); *C04B 41/0036* (2013.01);
(Continued)

(58) Field of Classification Search
None
See application file for complete search history.

(56) References Cited

U.S. PATENT DOCUMENTS

| 7,211,236 B2 * | 5/2007 | Stark ................... C09K 3/1409 |
| | | 423/594.15 |
| 9,209,400 B2 * | 12/2015 | Hayton ................. H05K 3/027 |
| 2006/0185980 A1 * | 8/2006 | Fukuda ............... G01N 27/128 |
| | | 204/431 |

FOREIGN PATENT DOCUMENTS

| CN | 101241963 A | 8/2008 |
| CN | 101593831 A | 12/2009 |

(Continued)

OTHER PUBLICATIONS

First Office Action from China patent office in a counterpart Chinese patent Application 202111524535.5, mailed Jul. 27, 2022.

(Continued)

*Primary Examiner* — Peter J Macchiarolo
*Assistant Examiner* — Jermaine L Jenkins

(57) ABSTRACT

An integrated polymer-derived ceramic (PDC) thin-film sensor produced by laser pyrolysis and additive manufacturing and a fabrication method thereof are provided. Using a metal component or an insulating material as a substrate, a PDC-doped composite insulating film layer with high density, high insulation, and high temperature resistance is formed by a layer-by-layer laser pyrolysis and additive manufacturing on the surface of the metal component, and a strain sensitive layer with excellent electrical conductivity is obtained by Weissenberg direct writing process PDC-doped filler sensitive grid on the composite insulating film layer and laser pyrolysis enhancing graphitization of PDC. In this way, the in situ integrated laser fabrication of highly insulating film layer, sensitive grid with excellent electrical conductivity, and metal substrate based on PDC materials is (Continued)

developed, which achieves the laser processing of "liquid-solid-function" transformation of PDC composites and allows the successful use thereof in strain sensing of metallic materials.

8 Claims, 4 Drawing Sheets

(51) Int. Cl.
  *B33Y 70/00* (2020.01)
  *B33Y 80/00* (2015.01)
  *C04B 35/626* (2006.01)
  *C04B 41/00* (2006.01)
  *C04B 41/45* (2006.01)
  *G01L 1/00* (2006.01)

(52) U.S. Cl.
  CPC ...... *C04B 41/0072* (2013.01); *C04B 41/4535* (2013.01); *C04B 41/4554* (2013.01); *C04B 41/4572* (2013.01); *G01L 1/005* (2013.01); *B33Y 10/00* (2014.12); *B33Y 70/00* (2014.12); *B33Y 80/00* (2014.12); *C04B 2235/665* (2013.01)

(56) References Cited

FOREIGN PATENT DOCUMENTS

| | | | |
|---|---|---|---|
| CN | 101669224 | | 3/2010 |
| CN | 110518256 A | * | 11/2019 |
| CN | 110954234 A | | 4/2020 |
| CN | 110957294 A | | 4/2020 |
| EP | 1308705 A1 | | 5/2003 |
| JP | 2014192465 A | | 10/2014 |

OTHER PUBLICATIONS

"High Temperature Thin-Film Temperature Sensor Based on SIBON", Li Yall, et al., «Micro nano Electronics Technology», vol. 58, Issue 9, p. 789-795.

"Review on High Temperature Thin Film Thermocouple for Aero-Engine", Zhou Yingfeng, et al., «Aeronautical Manufacturing Technology», vol. 63, Issue 6, p. 82-89, Figure 12.

* cited by examiner

INTEGRATED POLYMER-DERIVED CERAMIC THIN-FILM SENSOR PRODUCED BY LASER PYROLYSIS AND ADDITIVE MANUFACTURING AND FABRICATION METHOD THEREOF

CROSS-REFERENCE TO RELATED APPLICATIONS

This application is based upon and claims priority to Chinese Patent Application No. 202111524535.5, filed on Dec. 14, 2021, the entire content of which is incorporated herein by reference.

TECHNICAL FIELD

The present invention belongs to the technical field of sensors, and in particular relates to an integrated polymer-derived ceramic (PDC) thin-film sensor produced by laser pyrolysis and additive manufacturing and a fabrication method thereof.

BACKGROUND

With the development of aviation and aerospace technologies, the demand for intelligent monitoring of high-temperature service environments is becoming increasingly high. Polymer-derived ceramic (PDC) materials are a new type of high-temperature ceramics. PDC is considered an excellent high-temperature sensing material because it has excellent high-temperature thermal stability, oxidation resistance and creep resistance, as well as its ability to maintain an amorphous form below 1700° C. and possesses semiconductor characteristics. PDC is used by many researchers for monitoring physical quantities such as temperature, strain, and heat flow in high-temperature fields.

Compared with traditional sensors, thin-film sensors have the advantages of having a small size (with thickness in the range of micrometers), being capable of in situ fabrication, and posing less impact on a test environment, which is broadly used in the technical field of parameter testing of special-shaped precision structural components from the fields of aviation and aerospace. At present, there are few literatures related to the fabrication of PDC thin-film sensors. The published invention patent application under examination (a polymer-derived ceramic thin-film RTD and its fabrication method, application number 201911309009.X) mainly discloses the use of polymer precursors to fabricate sensors and includes the main process of transforming the polymer precursors into ceramics by cross-linking, solidification, and high-temperature pyrolysis (above 800° C.), thereby realizing the production of conductive sensitive components.

To realize more efficient, convenient, and wide-ranging practical application requirements of PDC thin-film sensors, it is desirable to develop a fabrication process with high efficiency, flexibility, and less thermal damage to substrate materials, and to achieve the integrated fabrication of highly insulating film layer, sensitive grid with excellent electrical conductivity, and substrate, which is the key to realize in situ sensing function in the technical field of parameter testing of oddly-shaped precision structural components.

SUMMARY

To solve the above problems, the present invention proposes an integrated polymer-derived ceramic (PDC) thin-film sensor produced by laser pyrolysis and additive manufacturing and a fabrication method thereof.

To achieve the above objective, the present invention adopts the following technical solutions:

An integrated polymer-derived ceramic (PDC) thin-film sensor produced by laser pyrolysis and additive manufacturing comprising a base and a sensitive grid. The sensitive grid is melted on the base through laser pyrolysis.

The thickness of the sensitive grid ranges between 10-20 μm.

Preferably, the base is a substrate made of an insulating material; and the insulating material is alumina. A fabrication method of the sensor includes the following steps:
1) pre-treatment: subjecting an insulating alumina substrate to successive ultrasonic cleaning and drying;
2) preparation of the sensitive grid: preparing a mixed solution of conductive filler and PDC solution, and writing the mixed solution directly on the insulating palumina substrate in step 1) through the Weissenberg direct writing process, and after heating and solidifying, performing a laser pyrolysis treatment at the same temperature to promote a transformation of PDC organic matters into ceramics by virtue of photothermal action, as well as to enhance the degree of graphitization of carbon, as a result the sensitive grid is formed with good conductivity. Thus, the PDC strain sensor with the insulating substrate is fabricated.

Preferably, the base is composed of a substrate, a transition layer, and a composite insulating layer that are in sequential arrangement. The sensor is sequentially composed of, from bottom to top, the substrate, the transition layer, the composite insulating layer, and the sensitive grid. The thickness of the composite insulating layer ranges between 50-200 μm. The substrate is made of a metallic material.

The composite insulating layer and the sensitive grid of the sensor are both based on a PDC material, the composite insulating layer is composed of PDC-doped inert insulating powder and PDC-doped inert insulating powder with infiltration effect, and the sensitive grid is composed of PDC-doped conductive powder.

Further, the substrate is made of a Ni-based alloy material, and the composite insulating layer includes an insulating layer and an infiltration insulating layer. The fabrication method of the sensor includes the following steps:
1) Pre-treatment: subjecting a nickel-based alloy sheet to successive ultrasonic cleaning and drying, and then depositing a transition layer (operable at an operation temperature in excess of 600° C.) on the nickel-based alloy sheet by a magnetron sputtering machine;
where, the thickness of the transition layer ranges between 3-10 μm.
2) Preparation of the insulating layer: preparing a mixed solution of PDC solution and inert insulating powder, and writing the mixed solution directly on the transition layer in step 1) through the Weissenberg direct writing process, after heating and solidifying, performing a laser treatment at the same temperature to realize a transformation from organic matters into inorganic ceramics by virtue of photothermal action during the process of laser pyrolysis. After cooling to room temperature, coating a second layer of the mixed solution on the insulating layer by screen printing, and then conducting the same steps to accomplish heating, solidifying, and laser treatment to form a second insulating layer, which realizes in situ laser additive manufacturing;

for the mixed solution of PDC and insulating powder mentioned above, given that the insulating powder and the transition layer have close expansion coefficient and good insulating performance, a small amount of infiltration insulating powder is doped mainly for the purpose of melt infiltration due to its relatively low melting point.

3) Preparation of the infiltration insulating layer: preparing a mixed solution of micron powder with infiltration insulation effect and PDC solution, coating the mixed solution on the insulating layer obtained in step 2) by screen printing, and after heating and solidifying, conducting multiple times of laser scanning heat treatment, so that the powder is melted multiple times with the surface of a film layer resurfaced, thereby reduces the surface roughness, enhances the effect of infiltration and filling, and as a result a relatively dense infiltration insulating layer is obtained, preparing a second infiltration insulating layer in the same way, thus forming a dense melt infiltration layer for filling cracks, pores, and other defects that may exist in the thin film to achieve high insulation performance and obtain a composite insulating film layer.

4) Preparation of the sensitive grid: preparing a mixed solution of conductive powder and PDC, realizing the process of thin-film formation and patterning through the Weissenberg direct writing platform to write the mixed solution directly on the composite insulating layer, after heating and solidifying, performing a laser treatment at the same temperature to obtain the integrated PDC thin-film strain sensor.

The integrated polymer-derived ceramic (PDC) thin-film sensor produced by laser pyrolysis and additive manufacturing fabricated above and the fabrication method thereof can be applied in strain sensing of metallic materials.

The present invention has the following advantages:

1. In the present invention, the conductive sensitive layer is provided with PDC-doped conductive powder, which, on the one hand, can increase electrical conductivity thereof, and on the other hand, can reduce cracking caused by excessively large temperature gradient generated during a heat treatment process. The heat treatment process is relatively simple. The laser scanning treatment enhances the transformation of PDC organic matters into ceramics and the graphitization transformation. This is because non-metallic materials have a high absorption rate of carbon dioxide laser and can instantaneously generate a high temperature above 2000° C. near the surface of the absorbing material, while the absorption rate for a metal substrate is low, thereby reducing the impact on the substrate. At the same time, the electrical conductivity can be regulated by adjusting laser parameters. Thus, a preparation process of a conductive sensitive layer thin film with high efficiency, flexibility, and less thermal damage to substrate materials is obtained.

2. In the present invention, the composite insulating layer is mainly composed of a multi-layer film structure. PDC here mainly acts as an adhesive and forms a mixed solution with micron powder having insulation performance or micron powder having infiltration insulation effect. The insulating layer with desired thickness can be prepared by a direct writing process or a screen printing process. Finally, cross-linking, solidification, and laser treatment are conducted to obtain the required insulating layer. Although the laser enhances the graphitization transformation of PDC, due to the dominance of insulating powder in the mixed solution and the need for multiple times of laser treatment in the atmosphere, better cladding and infiltration effects are achieved, and meanwhile, the decarburization effect is produced by the multiple times of laser treatment. Therefore, it is difficult for the film layer to form conductive networks and channels. The multi-layer structure of the composite film layer also plays the role of "layer-by-layer fortification", so that a composite insulating film layer with high insulation performance is obtained by laser pyrolysis and additive manufacturing.

3. In the present invention, a metal component is directly used as the substrate, and a composite insulating film layer with high insulation, high density, and high temperature resistance is formed by a layer-by-layer deposition on the metal component deposited with the transition layer through the Weissenberg direct writing process, screen printing, laser pyrolysis, and additive manufacturing. On this basis, the sensitive grid is written directly on the composite insulating film layer through the direct-writing patterning, and the graphitization of PDC is enhanced by laser pyrolysis, thus forming conductive channels in the sensitive grid. In this way, the in situ integrated fabrication of highly insulating film layer, sensitive grid with excellent electrical conductivity, and metal substrate is realized, which plays a key role in realizing in situ sensing function and monitoring of high temperature and other environments in the technical field of parameter testing of oddly-shaped precision structural components.

Figure 1:
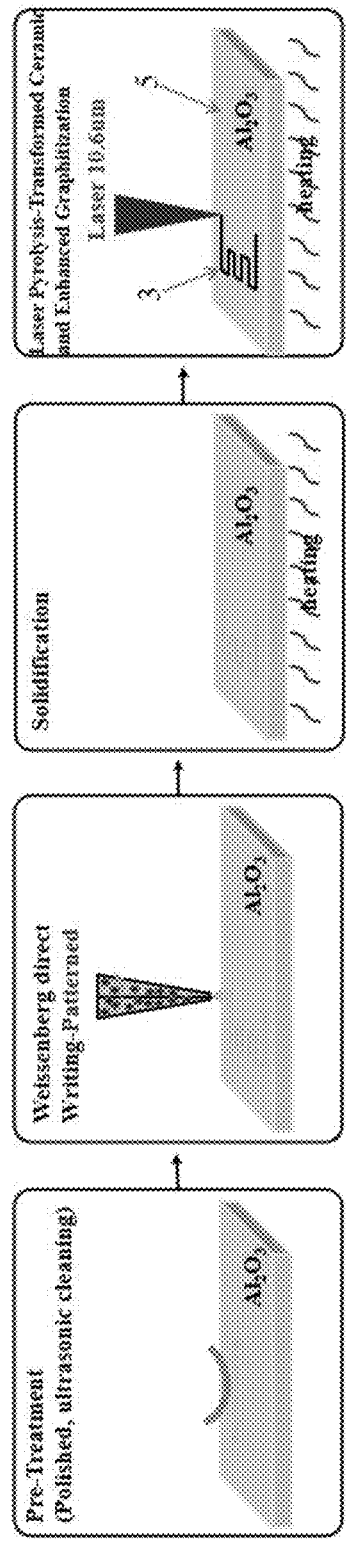
FIG. 1 is a schematic diagram showing the fabrication process of the integrated PDC thin-film strain sensor produced by laser pyrolysis and additive manufacturing in Embodiment 1.

In the drawings: 1 represents a nickel-based alloy substrate, 2 represents a PDC composite insulating film layer, 3 represents a PDC sensitive grid, and 4 represents a sensitive grid electrode.

DETAILED DESCRIPTION OF THE EMBODIMENTS

In order to make the purposes, technical solutions, and advantages of the embodiments of the present invention clearer, the technical solutions in the embodiments of the present invention will be clearly and completely described below in conjunction with the embodiments of the present invention. Obviously, the described embodiments are a part of the embodiments of the present invention, rather than all embodiments. Based on the embodiments of the present invention, all other embodiments obtained by those of ordinary skill in the art without creative efforts shall fall within the protection scope of the present invention.

Embodiment 1

The present embodiment provides a PDC strain sensor with an insulating substrate produced by laser pyrolysis and additive manufacturing, which sequentially includes, from bottom to top, the insulating substrate and a strain sensitive grid. The thickness of the sensitive grid ranges between 10-20 µm.

The specific fabrication process of the above-mentioned laser-cladding PDC strain sensor with the insulating substrate is shown in FIG. 1 and specifically includes the following steps:

1) Pre-treatment: First, the alumina substrate 5 is ultrasonically cleaned for 20-60 min, dried in a drying oven, and removed.

Figure 5:
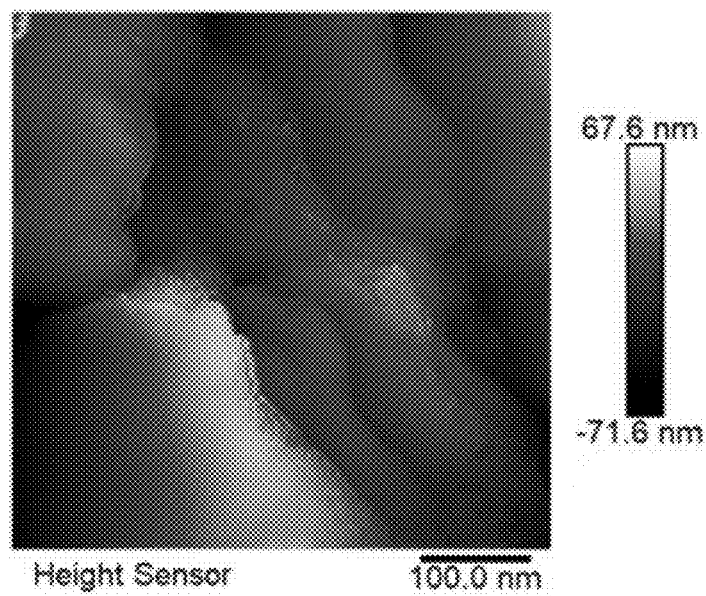
FIG. 5 is an atomic force microscope (AFM) image of the sensitive grid after laser treatment.
Figure 6:
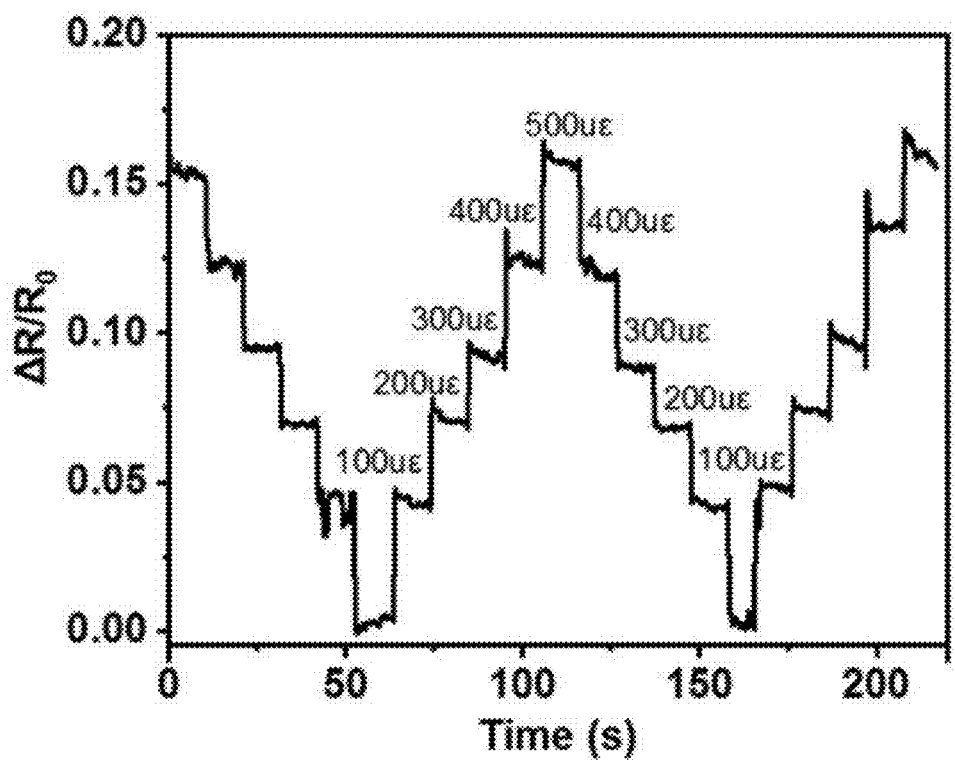
FIG. 6 is a strain signal test diagram of the integrated thin-film strain sensor in Embodiment 2.

2) Preparation of the sensitive grid 3: A mixed solution of conductive powder and PDC is prepared and written directly on the insulating substrate (i.e. the alumina substrate 5) in step 1) using the Weissenberg direct writing process. After solidifying for 20 min, a laser treatment is performed, such that the graphitization transformation of organic matters is achieved and enhanced by laser pyrolysis. AFM shows the generation of graphite, as shown in FIG. 5.

Thus, the PDC strain sensor with the insulating substrate is fabricated.

Embodiment 2

The present embodiment provides an integrated PDC thin-film strain sensor produced by laser pyrolysis and additive manufacturing, which sequentially includes, from bottom to top, a nickel-based alloy substrate, a composite insulating layer, and a strain sensitive grid. The thickness of the composite insulating layer ranges between 50-200 µm. The thickness of the sensitive grid ranges between 10-20 µm.

Figure 2:
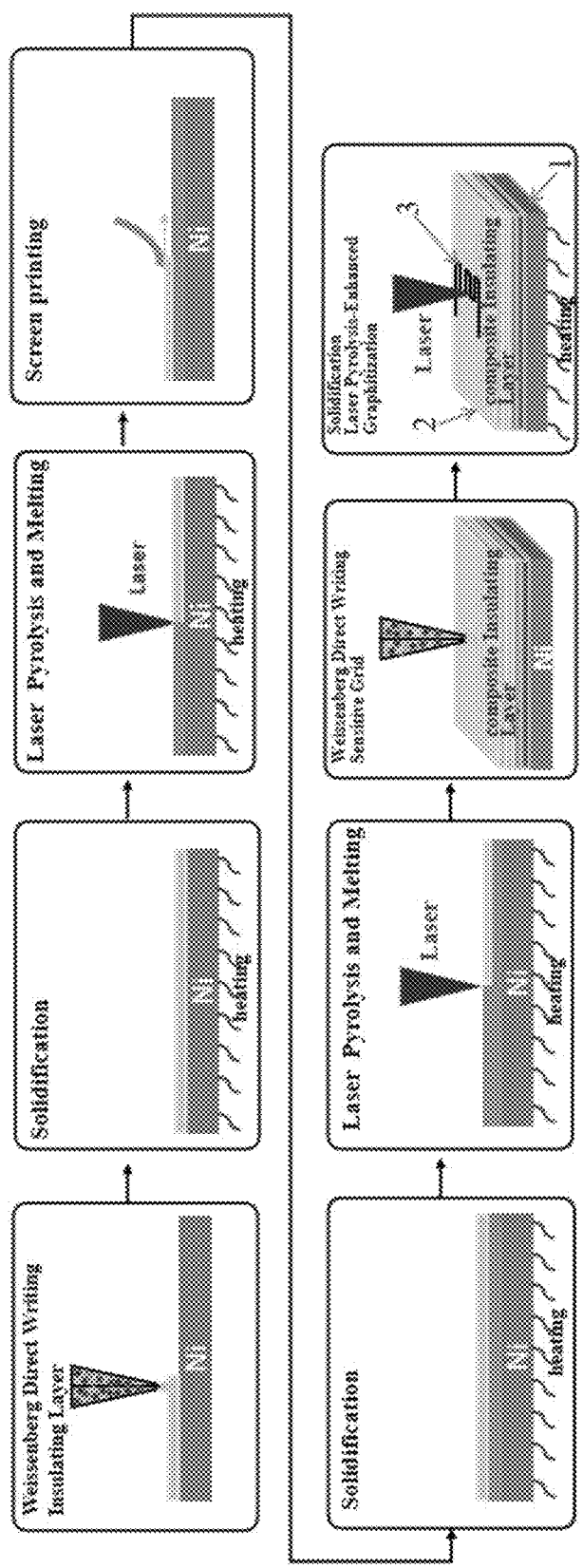
FIG. 2 is a schematic diagram showing the fabrication process of the integrated PDC thin-film strain sensor produced by laser pyrolysis and additive manufacturing in Embodiment 2.

The specific fabrication process of the above-mentioned integrated PDC strain sensor is shown in FIG. 2 and specifically as follows:

1) Pre-treatment: A nickel-based alloy sheet 1 is ultrasonically cleaned for 20-60 min and dried in a drying oven. A transition layer of 3-10 µm is deposited by sputtering on the nickel-based alloy sheet 1 through a magnetron sputtering machine.

2) Preparation of the insulating layer: A mixed solution of PDC solution, insulating powder, and insulating powder with infiltration effect is prepared, stirred with a magnetic stirrer for 1 h, and taken out for use. The thickness of the insulating layer is accurately controlled by the Weissenberg direct writing process. After solidifying for 20-60 min, a laser treatment is performed. After naturally cooling to room temperature, a second layer of the same mixed solution is coated on the insulating layer using screen printing technique, followed by similar solidifying, cross-linking, and laser treatment with identical laser parameters.

Figure 3:
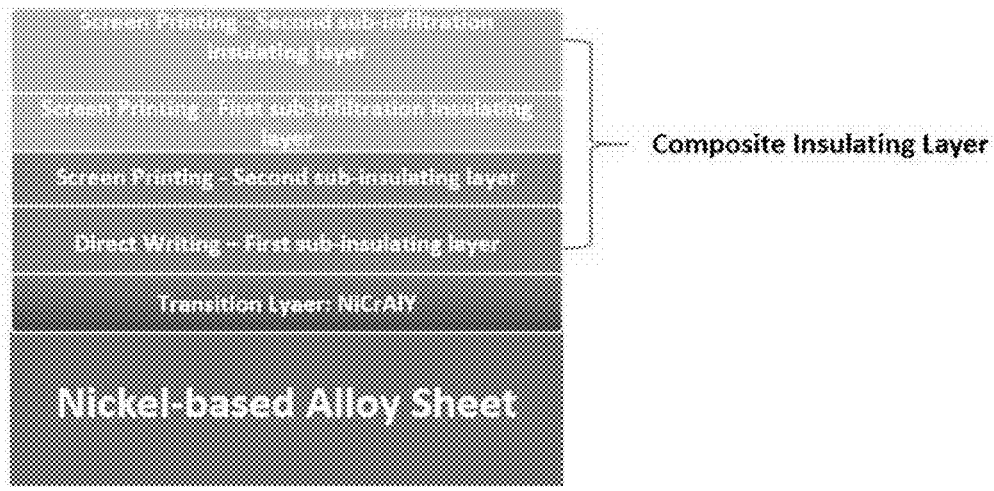
FIG. 3 is a schematic diagram showing the film layer structure of the composite insulating layer in Embodiment 2.

3) Preparation of the infiltration insulating layer: A mixed solution of infiltration insulating powder and PDC solution, magnetically stirred for 1-2 h, and taken out. The mixed solution is coated on the insulating layer obtained in step 2) similarly by screen printing. After solidification, a laser scanning heat treatment is conducted to yield a relatively dense infiltration layer. A second infiltration insulating layer is prepared with the same method and parameters, and finally, a composite insulating film layer 2 as shown in FIG. 3 is obtained.

4) Preparation of the sensitive grid 3: A mixed solution of conductive powder and PDC is prepared and written directly on the composite insulating layer prepared in steps 2) and 3) using the Weissenberg direct writing process. After solidifying for 20 min, a laser treatment is performed, such that the graphitization transformation of organic matters is enhanced by laser pyrolysis. AFM shows the generation of graphite, as shown in FIG. 5.

5) Manufacturing of solder joints and lead wires of thin-film strain sensor: Platinum wires are adhered to two solder joints of the sensitive grid with commercial graphene conductive glue, followed by standing for 5-12 h and heating at 120-150° C. for 2 h to realize a relatively firm contact between the lead wires and the solder joints.

Figure 4:
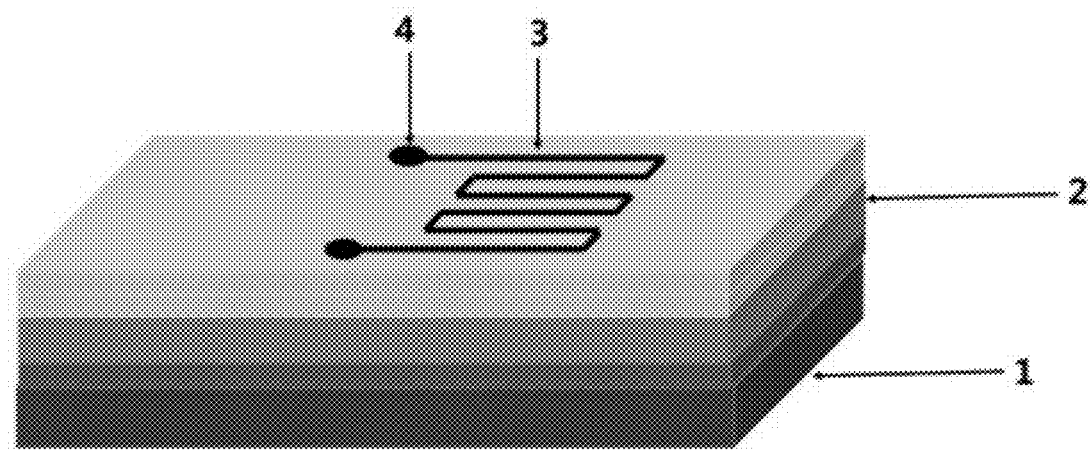
FIG. 4 is a structural diagram of the integrated thin-film strain sensor in Embodiment 2.

Thus, the integrated PDC thin-film strain sensor is fabricated, as shown in FIG. 4.

The above embodiments are only used to illustrate the technical solutions of the present invention, rather than to limit the present invention. Although the present invention has been described in detail with reference to the foregoing embodiments, those of ordinary skill in the art should understand that: the technical solutions described in the foregoing embodiments can be modified, or some of the technical features can be equivalently replaced. These modifications or replacements do not make the essence of the corresponding technical solutions deviate from the spirit and scope of the technical solutions of the embodiments of the present invention.

What is claimed is:

1. An integrated polymer-derived ceramic (PDC) thin-film sensor produced by laser pyrolysis and additive manufacturing, wherein the sensor comprises a base and a sensitive grid, the sensitive grid is in situ fabricated on the base through the laser pyrolysis, and the sensitive grid is composed of a PDC-doped conductive filler;

a thickness of the sensitive grid ranges between 10-20 µm;
wherein a fabrication method of the sensor comprises the following steps:
preparing a mixed solution of a conductive filler and a PDC solution, and writing the mixed solution directly on the base through a Weissenberg direct writing process, after heating and solidifying, performing a laser treatment at the same temperature to obtain the integrated PDC thin-film sensor.

2. The integrated PDC thin-film sensor produced by laser pyrolysis and additive manufacturing according to claim 1, wherein the base of the integrated PDC thin-film sensor is composed of a substrate, a transition layer, and a composite insulating layer arranged in sequence.

3. The integrated PDC thin-film sensor produced by laser pyrolysis and additive manufacturing according to claim 1, wherein the base is an insulating alumina substrate.

4. The integrated PDC thin-film sensor produced by laser pyrolysis and additive manufacturing according to claim 2, wherein the sensor successively comprises, from bottom to top, the substrate, the transition layer, the composite insulating layer, and the sensitive grid, a thickness of the composite insulating layer ranges between 50 µm-200 µm, and the substrate is made of a metallic material.

5. The integrated PDC thin-film sensor produced by laser pyrolysis and additive manufacturing according to claim 4, wherein the composite insulating layer and the sensitive grid of the sensor are both based on a PDC material, the composite insulating layer is composed of a PDC-doped inert insulating filler.

6. The integrated PDC thin-film sensor produced by laser pyrolysis and additive manufacturing according to claim 5, wherein the substrate is made of a Ni-based alloy material, and the composite insulating layer comprises an insulating layer and an infiltration insulating layer; the insulating layer comprises a first sub-insulating layer and a second sub-insulating layer, the infiltration insulating layer comprises a first sub-infiltration insulating layer and a second sub-infiltration insulating layer, a fabrication method of the base of the sensor comprises the following steps:

subjecting a nickel-based alloy sheet to successive ultrasonic cleaning and drying, and then depositing a transition layer on the nickel-based alloy sheet by a magnetron sputtering machine;

preparing a mixed solution of the PDC solution and inert insulating powder, and writing the mixed solution directly on the transition layer in step 1) through the Weissenberg direct writing process, after heating and solidifying, performing the laser treatment at the same temperature to form the first sub-insulating layer, after cooling to room temperature, coating a layer of the mixed solution on the insulating layer by screen printing, and then conducting heating, solidifying, and the laser treatment to form the second sub-insulating layer;

preparation of the infiltration insulating layer: preparing a mixed solution of inert insulating powder with infiltration effect and the PDC solution, coating the mixed solution on the second sub-insulating layer by screen printing, after heating and solidifying, conducting the laser heat treatment to obtain the first sub-infiltration insulating layer, preparing the second sub-infiltration insulating layer in the same way.

7. The integrated PDC thin-film sensor produced by laser pyrolysis and additive manufacturing according to claim 6, wherein a thickness of the transition layer ranges between 3-10 μm.

8. The integrated PDC thin-film sensor produced by laser pyrolysis and additive manufacturing according to claim 1, wherein before the step of writing the mixed solution directly on the base through a Weissenberg direct writing process, the base is subject to successive ultrasonic cleaning and drying.

* * * * *